United States Patent
Zipperer et al.

(10) Patent No.: US 6,944,315 B1
(45) Date of Patent: Sep. 13, 2005

(54) METHOD AND APPARATUS FOR PERFORMING SCALE-INVARIANT GESTURE RECOGNITION

(75) Inventors: John B. Zipperer, Hillsboro, OR (US); Stephen V. Wood, Hillsboro, OR (US); Fernando C. M. Martins, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 736 days.

(21) Appl. No.: 09/704,385

(22) Filed: Oct. 31, 2000

(51) Int. Cl.[7] .................................................. G06K 9/00
(52) U.S. Cl. ........................ 382/103; 382/291; 348/169
(58) Field of Search ............................ 348/94, 97, 169, 348/413.1, 113, 116, 734, 14.15; 382/103, 104, 106, 107, 118, 123, 201, 206, 209, 225, 232, 236, 253, 268, 284, 291, 296, 305, 224, 235, 286, 295, 317, 321; 345/156, 159, 167, 419, 863; 342/457; 370/395.63

(56) References Cited

U.S. PATENT DOCUMENTS

| 5,045,861 | A | * | 9/1991 | Duffett-Smith | 342/457 |
| 5,323,470 | A | * | 6/1994 | Kara et al. | 382/103 |
| 5,511,153 | A | * | 4/1996 | Azarbayejani et al. | 345/419 |
| 5,581,276 | A | * | 12/1996 | Cipolla et al. | 345/156 |
| 6,215,914 | B1 | * | 4/2001 | Nakamura et al. | 382/284 |
| 6,501,515 | B1 | * | 12/2002 | Iwamura | 348/734 |
| 6,538,649 | B2 | * | 3/2003 | Bradski et al. | 345/419 |
| 6,542,621 | B1 | * | 4/2003 | Brill et al. | 382/103 |
| 6,606,412 | B1 | * | 8/2003 | Echigo et al. | 382/224 |

OTHER PUBLICATIONS

G. Rigoll et al. "High Performance Real–Time Gesture Recognition Using Hidden Markove Models," Proceeding of Gesture Workshop, Bielefield Germany, Sep. 1997, pp.*
G. Rigoll et al. "High Performance Real–Time Gesture Recognition Using Hidden Markov Models," Proceedings of Gesture Workshop, Bielefield Germany, Sep. 1997, pp.

* cited by examiner

Primary Examiner—Kanjibhai Patel
Assistant Examiner—Seyed Azarian
(74) Attorney, Agent, or Firm—Blakely, Sokoloff, Taylor & Zafman LLP

(57) ABSTRACT

A gesture recognition process includes tracking an object in two frames of video, determining differences between a location of the object in one frame of the video and a location of the object in another frame of the video, obtaining a direction of motion of the object based on the differences, and recognizing a gesture of the object based, at least in part, on the direction of motion of the object.

26 Claims, 4 Drawing Sheets

US 6,944,315 B1

METHOD AND APPARATUS FOR PERFORMING SCALE-INVARIANT GESTURE RECOGNITION

TECHNICAL FIELD

This invention relates to performing scale-invariant gesture recognition.

BACKGROUND

Automatic gesture recognition requires a system to obtain information about the motion of an object performing gestures. A video camera captures frames of video, with the object of interest in the field of view of the camera. The direction of motion of the object is inferred based on the frames. In traditional systems, the distance between the object and the camera affects the perceived motion and, therefore, affects the accuracy of gesture recognition.

DETAILED DESCRIPTION

Figure 1:
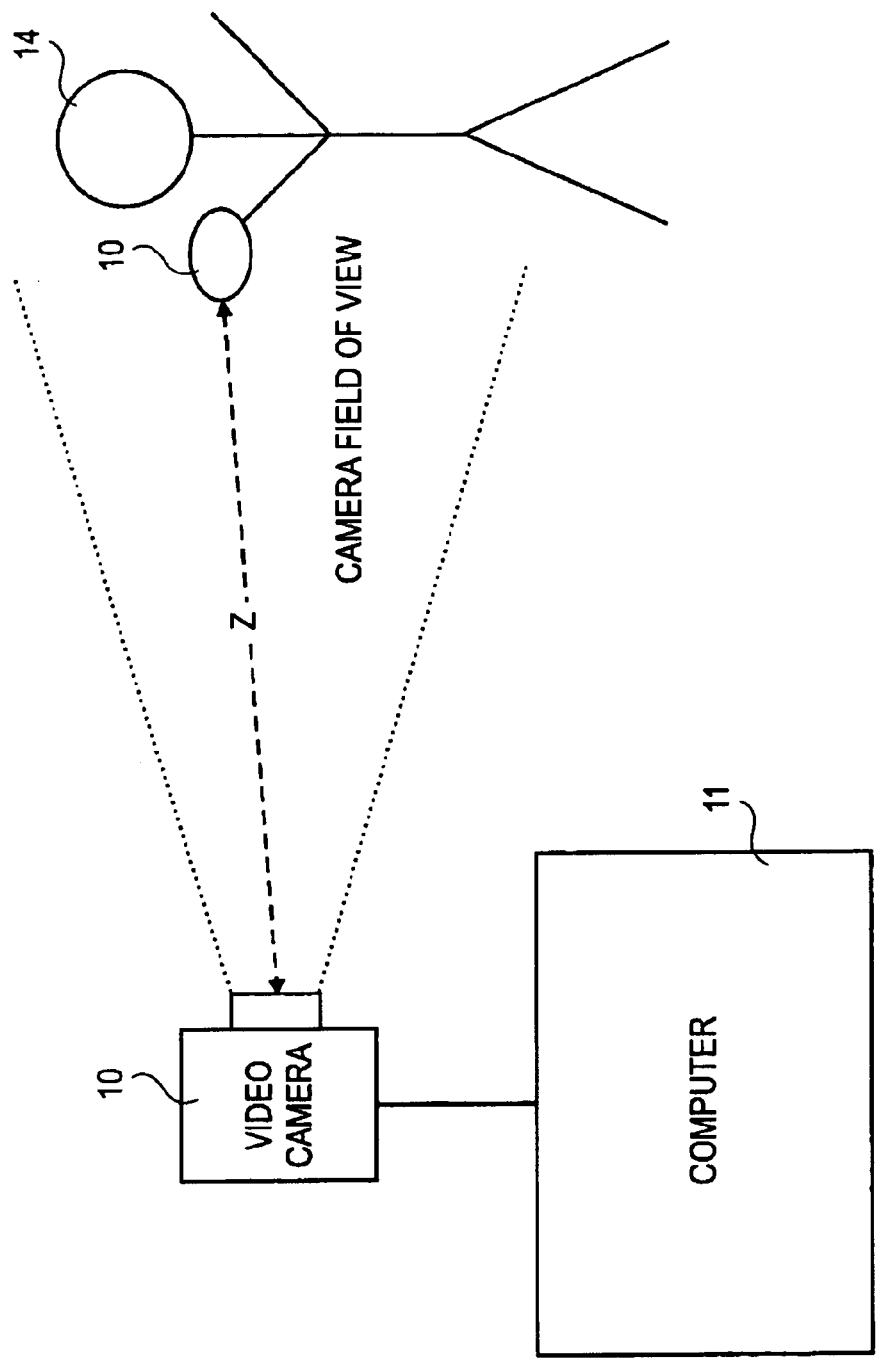
FIG. 1 is a block diagram of video camera and computer system for capturing images of an object.

FIG. 1 shows a video camera 10 coupled to a computer 11, such as a personal computer (PC). Video camera 10 captures frames of video and transfers those frames to computer 11, where they are processed. The frames of video include movements of an object 12 (e.g., the hand of person/subject 14) positioned in the field of view of video camera 10.

Figure 2:
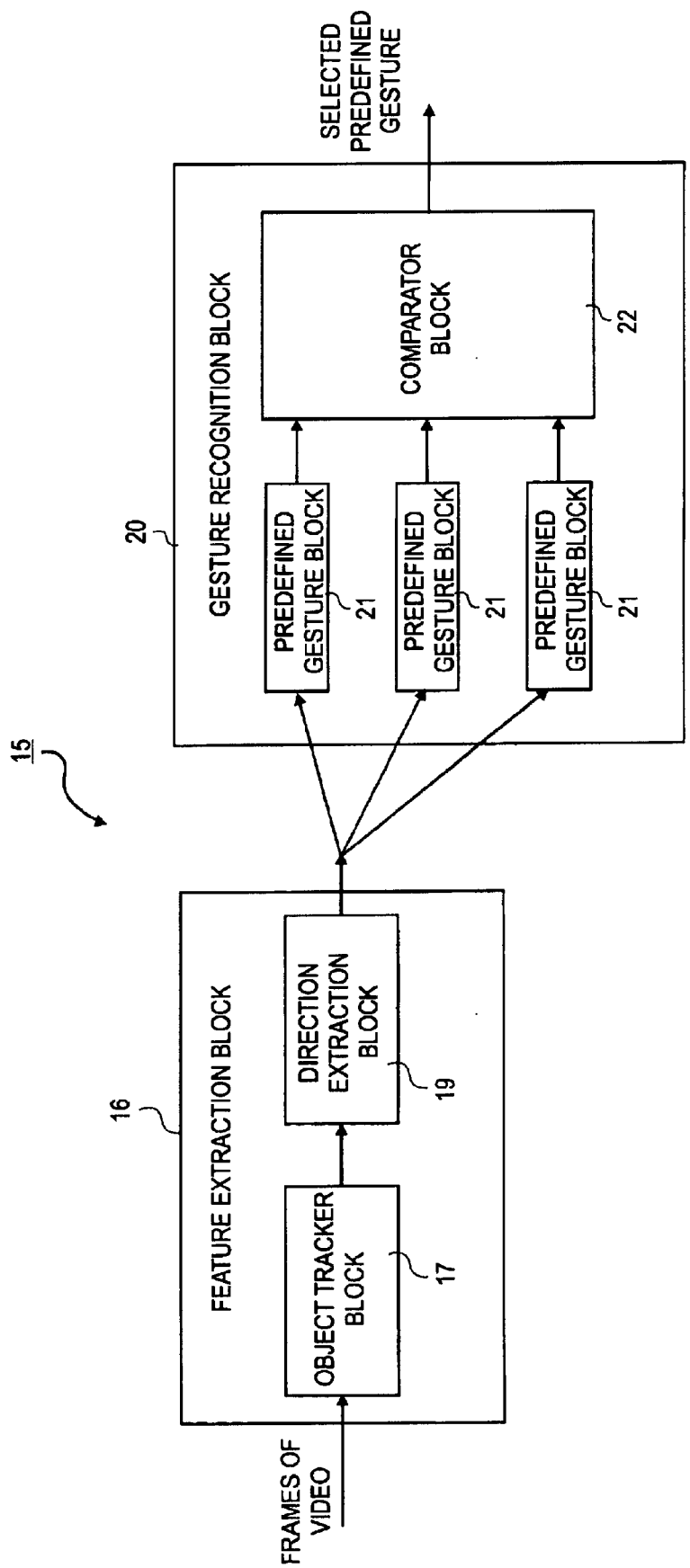
FIG. 2 is a block diagram of one embodiment of a gesture recognition process.

FIG. 2 shows a block diagram 15 of a gesture recognition process that is implemented by computer 11 using the frames of video captured by video camera 10. Feature extraction block 16 includes object tracker block 17 and direction extraction block 19. Object tracker block 17 tracks multiple objects in frames of video and direction extraction block 19 obtains a direction of motion (i.e., a trajectory) of each object based on the output of object tracker block 17. Gesture recognition block 20 includes predetermined gesture blocks 21 and comparator block 22. Each gesture block 21 takes the output of direction extraction block 19 and produces a probability that an observed gesture matches a predefined gesture.

In this embodiment, gesture blocks 21 are Hidden Markov models that are trained using the Baum-Welch algorithm, although the invention is not limited to use with this type of gesture block. Each gesture is defined by multiple gesture performances that are captured as part of the training process. Comparator block 22 determines which of the probabilities generated by gesture blocks 21 is the largest. The gesture that corresponds to the largest probability is the gesture that most closely matches the gesture performed by the object. This predefined gesture is output.

Figure 3:
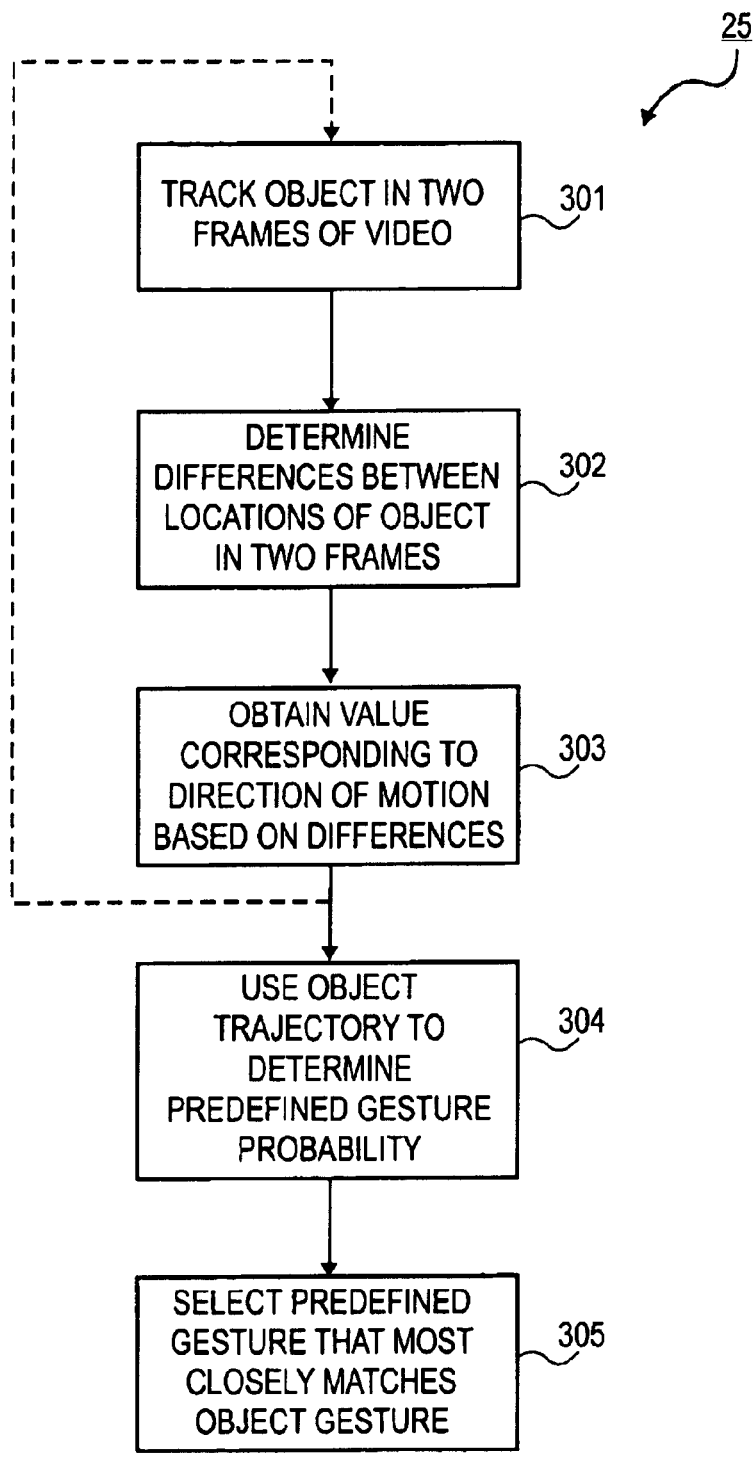
FIG. 3 is a flowchart showing the operation of the gesture recognition process.

FIG. 3 is a flowchart showing a process 25 that is depicted in FIG. 2. Process 25 tracks (301) an object 12 in the field of view of video camera 10 (FIG. 1). The object may be anything that can be tracked, examples of which are a recognizable body part, such as a hand, an arm, or a head of a subject 14, or it may be a predetermined flesh tone which indicates an exposed body part. Alternatively, the object may be a color tracker bracelet or other body sensor, headband, gloves, or similar article of clothing worn by subject 14.

Process 25 receives video data from video camera 10 and produces an array of object positions using object tracking. Object tracking is well-known in the art and is described, for example, in Bradski, G. R., "Real Time Face And Object Tracking As A Component Of A Perceptual User Interface", Applications of Computer Vision, 1998, WACV '98, Proceedings, Fourth IEEE Workshop, pgs. 214–219 (Oct. 19–21, 1998).

Process 25 determines (302) the first order differences between a location of each object on a pair of video frames. The video frames may be consecutive or non-consecutive, in this case. Process 25 determines the difference between the x coordinate of the object in a current frame x(t) and the x coordinate of the object in a previous frame x(t−1), and the difference between the y coordinate of the object in a current frame y(t) and the y coordinate of the object in the previous frame y(t−1). The first order differences dx(t) and dy(t) for the object are as follows:

$$dx(t)=x(t)-x(t-1)$$

$$dy(t)=y(t)-y(t-1)$$

Process 25 obtains a value (303) corresponding to the direction of motion of the object based on the differences dx(t) and dy(t). This value, θ, is determined as follows:

$$\theta=\tan^{-1}(dx(t)/dy(t)),$$

where "$\tan^{-1}$" is the inverse tangent function. Because the value, θ, is determined based on the differences between the locations of the object in two frames, the direction of motion of the object is invariant to the scale and translation of the object. In other words, the direction of motion of the object will not change regardless of the distance ("Z" in FIG. 1) between object 12 and video camera 10 (scale invariance) and regardless of the location of the object in the field of view of the video camera (translation invariance).

For example, assume that an object performs some gesture at two distances from the camera, namely Z' and Z". The trajectory of the object in 3D is given by X(t), Y(t) and Z' for the first performance of the gesture, and X(t), Y(t) and Z" for the second performance of the gesture. Although the gestures at Z' and Z" are the same, the object's motion observed in the video frame is different due to its location relative to the video camera. The object's motion at Z' is given by x'(t) and y'(t) and, at Z" is given as x"(t) and y"(t), where these values are defined as follows:

$$x'(t)=X(t)/Z'$$

$$y'(t)=Y(t)/Z'$$

$$x''(t)=X(t)/Z''$$

$$y''(t)=Y(t)/Z''$$

When the direction of motion given by the quotients dy"(t)/dx"(t) and dy'(t)/dx'(t) is determined, the Z values (Z' and Z") cancel. That is, $$dx''(t)=x''(t)-x''(t-1)=\{X(t)-X(t-1)\}/Z''$$

$$dy''(t)=y''(t)-y''(t-1)=\{Y(t)-Y(t-1)\}/Z''$$

Accordingly $$dy''(t)/dx''(t) = \{Y(t)-Y(t-1)\}/\{X(t)-X(t-1)\}$$

Similarly $$dx'(t) = x'(t) - x'(t-1) = \{X(t)-X(t-1)\}/Z'$$

$$dy'(t) = y'(t) - y'(t-1) = \{Y(t)-Y(t-1)\}/Z'$$

Accordingly $$dy'(t)/dx'(t) = \{Y(t)-Y(t-1)\}/\{X(t)-X(t-1)\}$$

Thus, dy'(t)/dx'(t)=dy"(t)/dx"(t), proving that the differences are scale (e.g., "Z" value) invariant. It can be similarly shown that the motions are translation invariant.

Gesture recognition operates on a finite-duration video clip. Initial and final frames define the video clip. These frames can be defined by a constant time interval or by variable time intervals, such as beats in music, other audio indicators, or any other type of perceptible indicator.

Process 25 repeats 301 to 303 a number N (N≧1) times to obtain N vectors (i.e., directions of motion) that describe a gesture of object 12. The N vectors correspond to the N "θ" values that are obtained from N pairs of frames that comprise the video clip. Thus, a gesture is defined by N vectors, each of which is determined from a pair of frames according to the above process.

Once a gesture performance (N vectors) has been captured, process 25 uses (304) the gesture performance to determine the probability that the gesture performance corresponds to a predefined gesture. In this context, the predefined gestures are derived from a training set of motion vectors that have been previously determined. The determination may be performed using a Hidden Markov Model (HMM) engine that identifies a given gesture from among its "vocabulary" of stored gestures. The HMM engine includes a bank of HMM modules, one per gesture. Evaluation of the likelihood that a gesture performance corresponds to a predefined gesture is implemented using a Viterbi recognition process, although other recognition processes may be used, examples of which are neural networks and Bayesian Classifiers.

Process 25 selects (305) the predetermined gesture that most closely matches the gesture performance obtained. In this embodiment, process 25 selects the gesture recognized by the HMM engine. The selected gesture may then be used for any purpose, one example of which is to control the motion of an animated character displayed on computer 11. Other functions may be performed using the selected gesture, such as that of a deviceless remote control, which recognizes gestures to change channels, e.g., of a television or the like.

Since process 25 allows a person greater freedom of motion relative to video camera 10 (i.e., since process 25 is scale, "Z" value, and translation invariant), process 25 can be used in a variety of systems. For example, process 25 may be used to introduce the motion of a person into a video game, e.g., to simulate dancing, fighting, or any other motion. A person's physical movements thus can be translated to the on-screen movements of an animated character, making the person feel like part of the on-screen action. Process 25 may also be used in virtual reality or command and control systems. Other gesture recognition processes not described herein can also be improved by using the foregoing process to obtain scale and translation invariance.

Figure 4:
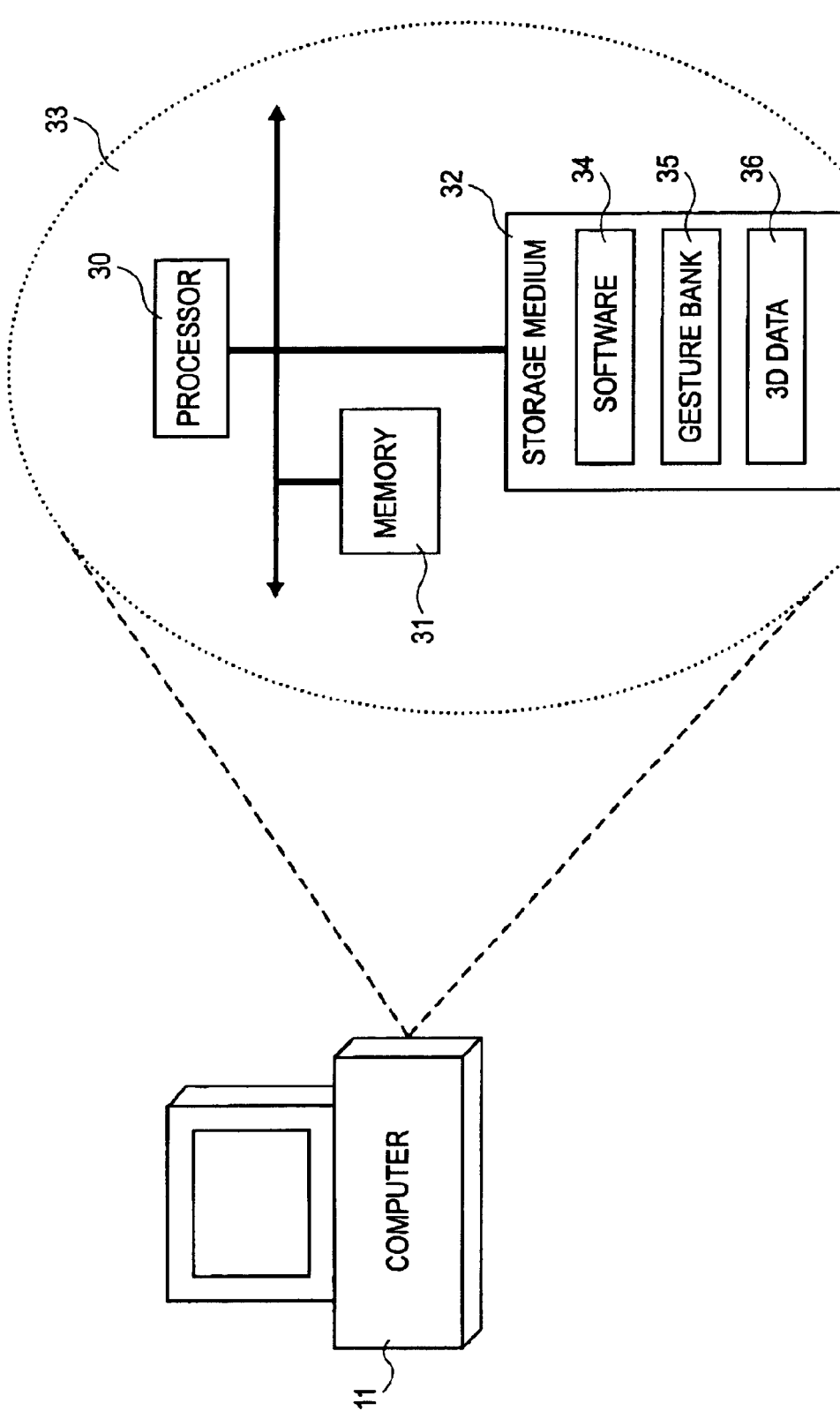
FIG. 4 is block diagram of a computer system on which the gesture recognition process may be implemented.

FIG. 4 shows a close-up view of computer 11. Computer 11 includes a processor 30 that is capable of processing 3D graphics, a memory 31, and a storage medium 32, e.g., a hard disk (see view 33). Storage medium 32 stores software 34 (which includes computer-executable instructions) for performing process 25, bank of predefined gestures 35, and data 36 for a 3D model. Processor 30 executes software 34 out of memory 31 to perform process 25.

Although a personal computer is shown in FIG. 4, process 25 is not limited to use with any particular hardware or software configuration; it may find applicability in any computing or processing environment. For example, process 25 can be used with a personal digital assistant (PDA) or other hand-held computer. Process 25 may be implemented in hardware, software, or a combination of the two. For example, process 25 may be implemented using logic gates such as NAND and NOR gates, programmable logic such as a field programmable gate array (FPGA), application-specific integrated circuits (ASICs), and/or a camera sensor or other electronics within video camera 10.

Process 25 may be implemented in one or more computer programs executing on programmable computers that each include a processor, a storage medium readable by the processor (including volatile and non-volatile memory and/or storage elements), at least one input device, and one or more output devices. Program code may be applied to data entered using an input device to perform process 25 and to generate output information. The output information may be applied to one or more output devices.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 25. Process 25 may also be implemented as a computer-readable storage medium, configured with a computer program, where, upon execution, instructions in the computer program cause the computer to operate in accordance with process 25.

Other embodiments not described herein are also within the scope of the following claims. For example, process 25 is not limited to use with gestures performed by people. Process 25 may be used to simulate gestures of any device or other movable object. Process 25 is not limited to use with HMMS, neural networks, and Bayesian Classifiers; other classifiers can be used instead of, or in addition to, these classifiers. Process 25 is not limited to use with Cartesian coordinates, and can be used with any coordinate system.

Process 25 can also be used outside the context of video games. For example, the video output may be ultrasound or other image-capturing system. In this regard, process 25 is not limited to use with video input. An RF (radio frequency) tablet, mouse, or other sensor may be used to provide gesture training data for use with gesture recognition.

What is claimed is:

1. A method comprising:

tracking an object in two frames of video;

determining differences between a location of the object in one frame of the video and a location of the object in another frame of the video;

obtaining a direction of motion of the object based on the differences; and recognizing a gesture performed by the object based, at least in part, on the direction of motion of the object;

wherein the differences comprise first order differences between coordinate locations of the object in the two frames of video.

2. The method of claim 1, wherein:
the coordinate locations of the object comprise Cartesian X and Y coordinate locations; and
the first order differences comprise a difference in the X coordinate location of the object in the two frames of video and a difference in the Y coordinate location of the object in the two frames of video.

3. The method of claim 1, wherein the direction of motion corresponds to a value that is obtained based on a quotient of the differences.

4. The method of claim 3, wherein the value is obtained by taking an inverse tangent of the quotient of the differences.

5. The method of claim 1, further comprising:
repeating, N times (N 1), tracking, determining and obtaining to obtain N vectors, each of the N vectors defining a direction of motion of the object, the N vectors together defining a gesture performed by the object;
wherein recognizing is performed using the N vectors.

6. The method of claim 1, further comprising:
selecting one of predefined gestures that most closely matches the gesture of the object.

7. The method of claim 1, wherein tracking comprises:
capturing the two frames of video between indicators;
obtaining the location of the object in the one frame of video; and
obtaining the location of the object in the other frame of video.

8. The method of claim 7, wherein the indicators comprise perceptible indicators.

9. The method of claim 1, wherein the direction of motion and gesture recognition is invariant relative to a scale and a translation of the object.

10. An article comprising:
a computer-readable medium that stores computer-executable instructions that cause a computer to:
track an object in two frames of video;
determine differences between a location of the object in one frame of the video and a location of the object in another frame of the video;
obtain a direction of motion of the object based on the differences; and
recognize a gesture performed by the object based, at least in part, on the direction of motion of the object;
wherein the differences comprise first order differences between coordinate locations of the object in the two frames of video.

11. The article of claim 10, wherein:
the coordinate locations of the object comprise Cartesian X and Y coordinate locations; and
the first order differences comprise a difference in the X coordinate location of the object in the two frames of video and a difference in the Y coordinate location of the object in the two frames of video.

12. The article of claim 10, wherein the direction of motion corresponds to a value that is obtained based on a quotient of the differences.

13. The article of claim 12, wherein the value is obtained by taking an inverse tangent of the quotient of the differences.

14. The article of claim 10, further comprising instructions that cause the computer to:
repeat, N times (N 1), tracking, determining and obtaining to obtain N vectors, each of the N vectors defining a direction of motion of the object, the N vectors together defining a gesture performed by the object;
wherein recognizing is performed using the N vectors.

15. The article of claim 10, further comprising instructions that cause the computer to:
select one of predefined gestures that most closely matches the gesture of the object.

16. The article of claim 10, wherein tracking comprises:
capturing the two frames of video between indicators;
obtaining the location of the object in the one frame of video; and
obtaining the location of the object in the other frame of video.

17. The article of claim 16, wherein the indicators comprise perceptible indicators.

18. The article of claim 10, wherein the direction of motion and gesture recognition is invariant relative to a scale and a translation of the object.

19. An apparatus for performing gesture recognition, comprising:
a camera to capture a video of an object, the object performing a gesture;
a feature extraction mechanism to track the object in frames of the video and to extract a feature sequence based on the frames, the feature sequence including a direction of motion of the object obtained based on differences between a location of the object in one frame of the video and a location of the object in another frame of the video; and
a gesture recognition mechanism to recognize the gesture performed by the object based, at least in part, on the extracted feature sequence;
wherein the differences comprise first order differences between coordinate locations of the object in the two frames of the video.

20. The apparatus of claim 19, wherein:
the coordinate locations of the object comprise Cartesian X and Y coordinate locations; and
the first order differences comprise a difference in the X coordinate location of the object in the two frames of video and a difference in the Y coordinate location of the object in the two frames of video.

21. The apparatus of claim 19, wherein the direction of motion corresponds to a value that is obtained based on a quotient of the differences.

22. The apparatus of claim 21, wherein the value is obtained by taking an inverse tangent of the quotient of the differences.

23. The apparatus of claim 19, wherein the processor executes instructions to:
select one of predefined gestures that most closely matches the gesture of the object.

24. The apparatus of claim 19, wherein the feature extraction mechanism comprises:
an object tracker component to capture frames of the video between perceptible indicators and to obtain a location of the objection in a frame of the video; and
a direction extraction block to obtain the direction of motion of the object based on the frames and locations of the objection in the frames of the video.

25. The apparatus of claim 19, wherein the direction of motion and gesture recognition is invariant relative to a scale and a translation of the object.

26. The apparatus of claim 19, wherein the gesture recognition mechanism comprises:

a plurality of predefined gesture units to store a plurality of predefined gestures, and to produce a probability of the gesture matching a predefined gesture, based on the feature sequence extracted by the feature extraction mechanism; and a comparator to select one of predefined gestures that most closely matches the gesture of the object, based on probabilities obtained by the plurality of predefined gesture units.

* * * * *